March 4, 1941.  L. OBSTFELD ET AL  2,233,958
COMBINATION STAPLING MACHINE AND TACKER
Filed Feb. 14, 1938  7 Sheets-Sheet 1
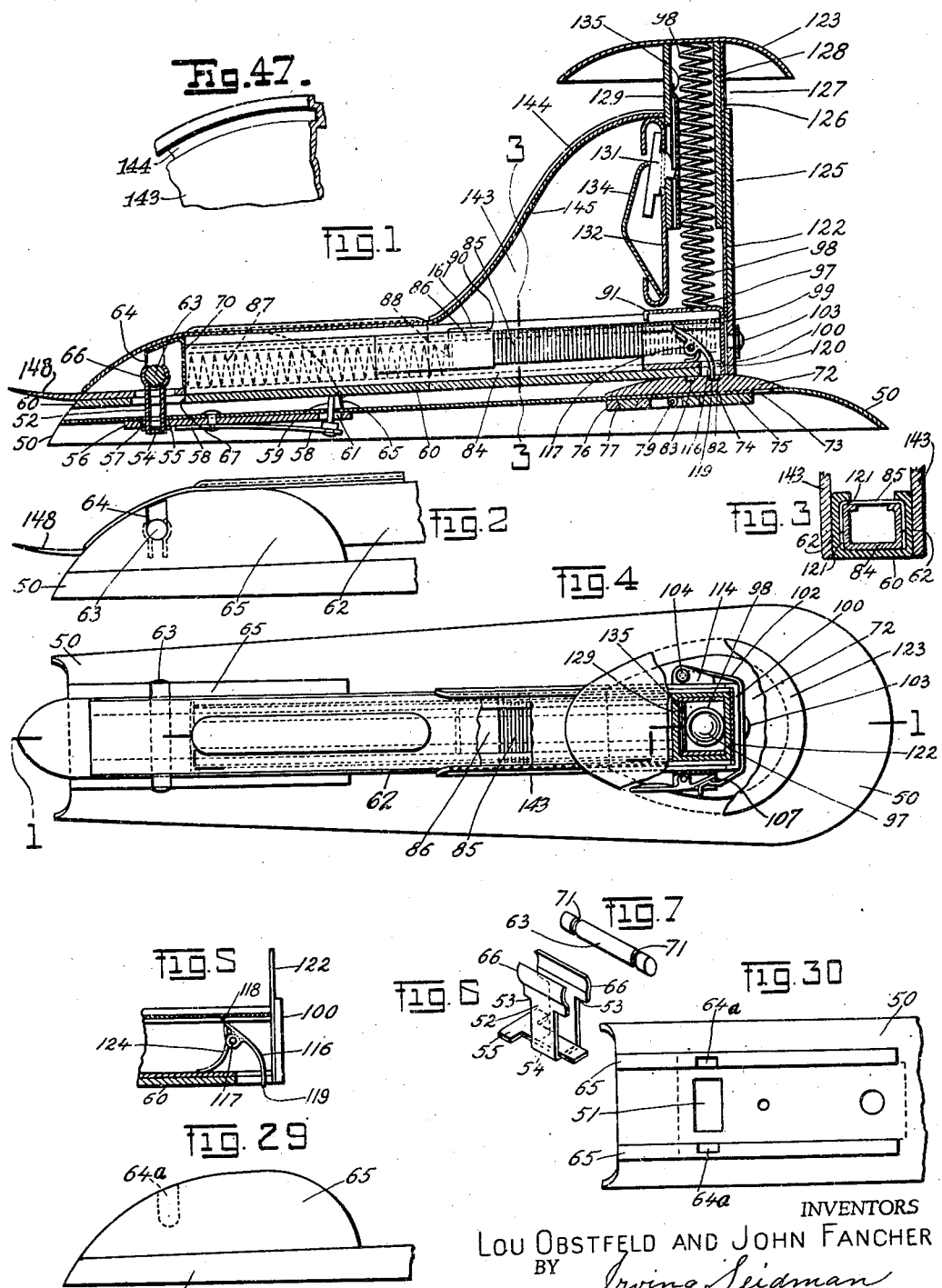
INVENTORS
LOU OBSTFELD AND JOHN FANCHER
BY Irving Seidman
THEIR ATTORNEY.

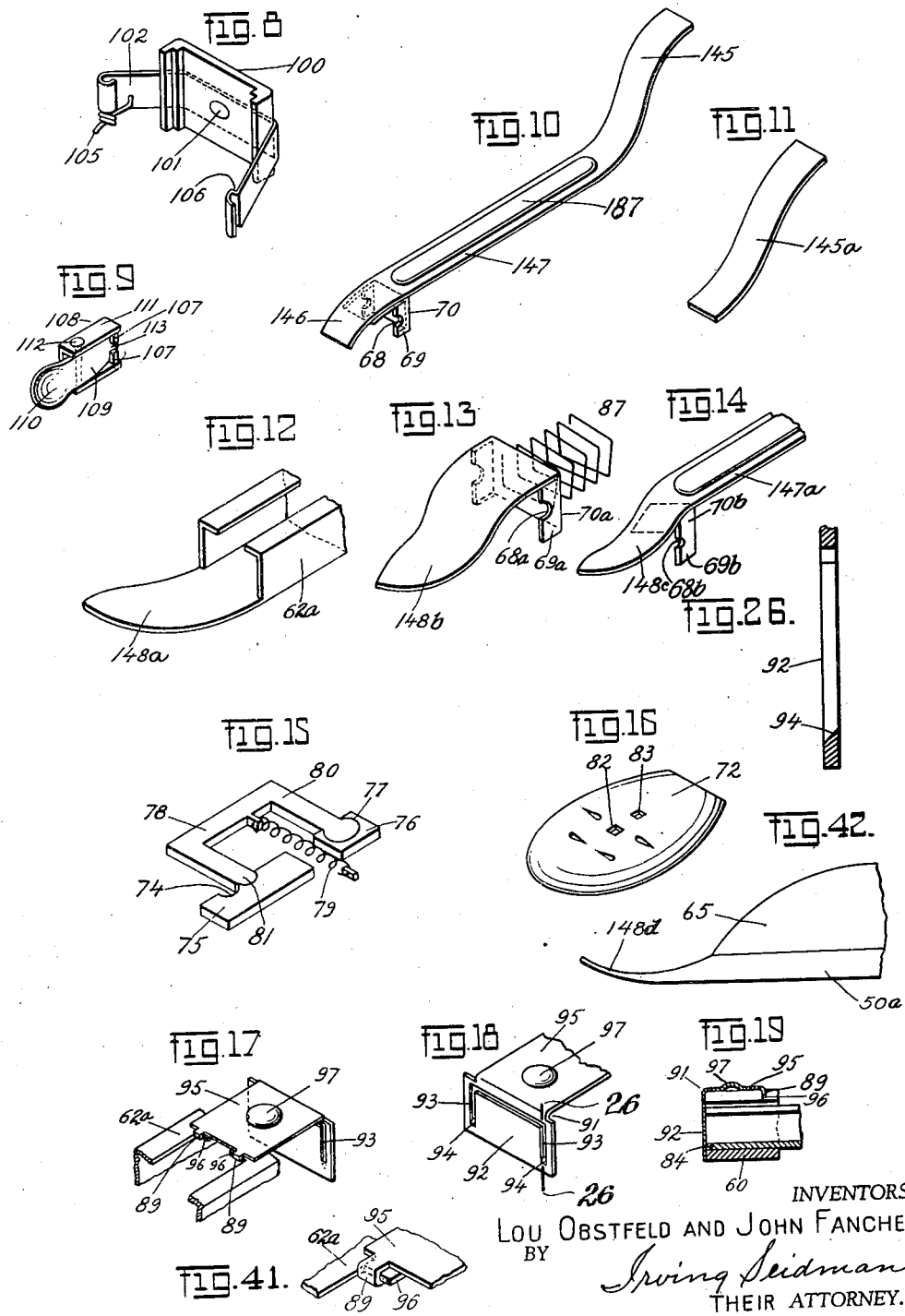

March 4, 1941.   L. OBSTFELD ET AL   2,233,958
COMBINATION STAPLING MACHINE AND TACKER
Filed Feb. 14, 1938   7 Sheets-Sheet 3
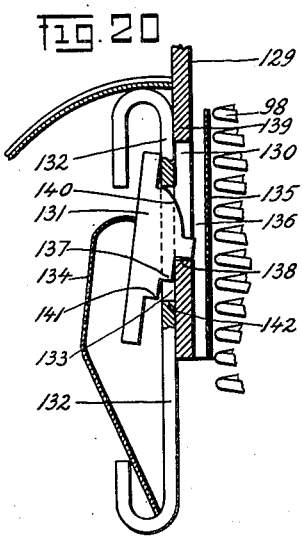
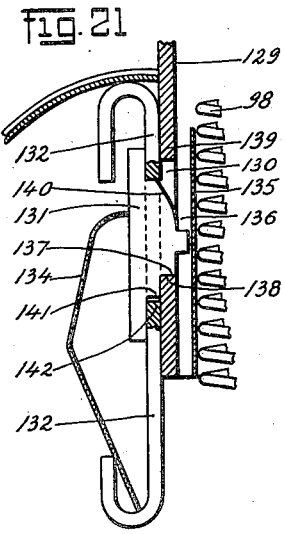
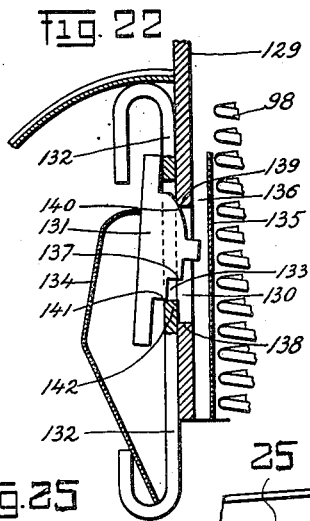
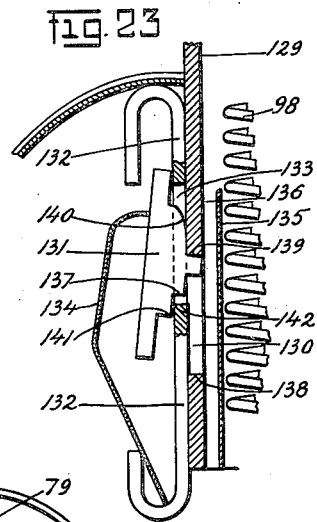
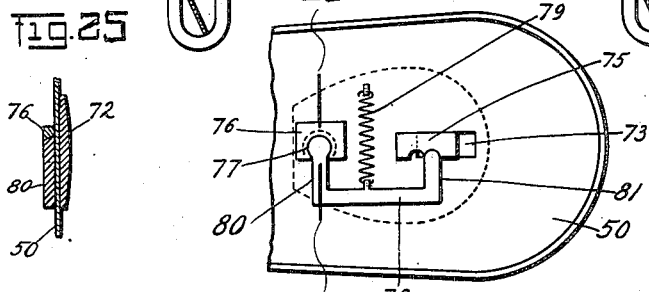
INVENTORS
Lou Obstfeld and John Fancher
BY Irving Seidman
THEIR ATTORNEY.

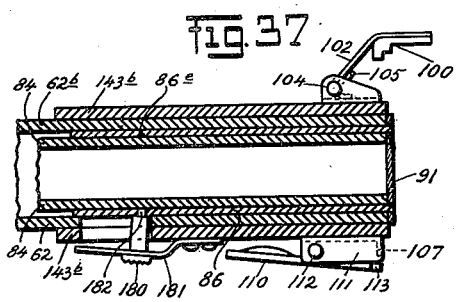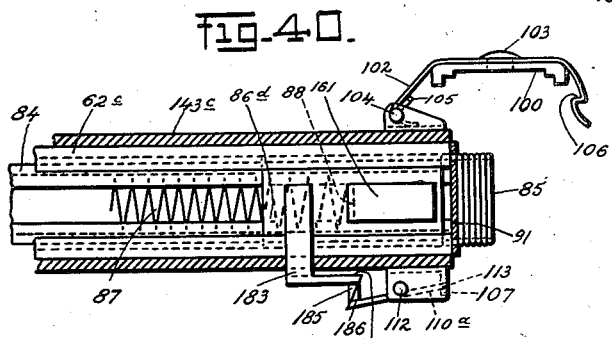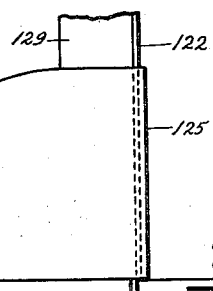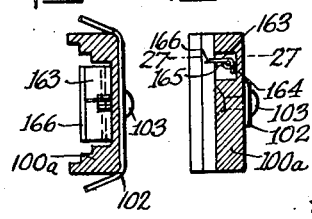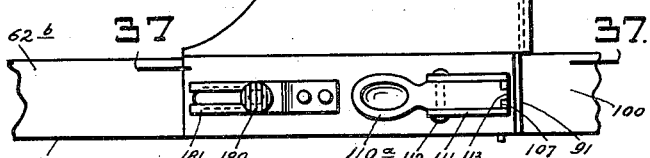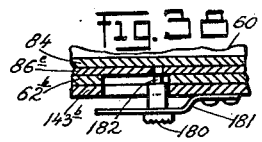

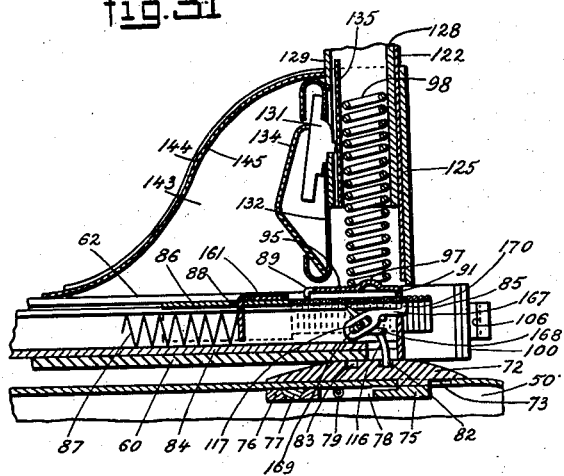
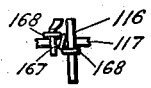
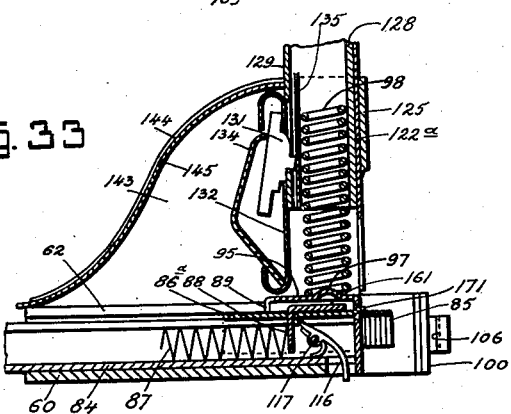
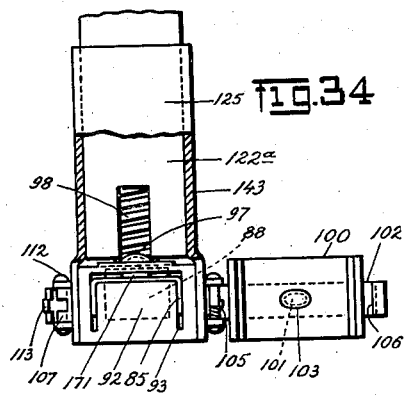

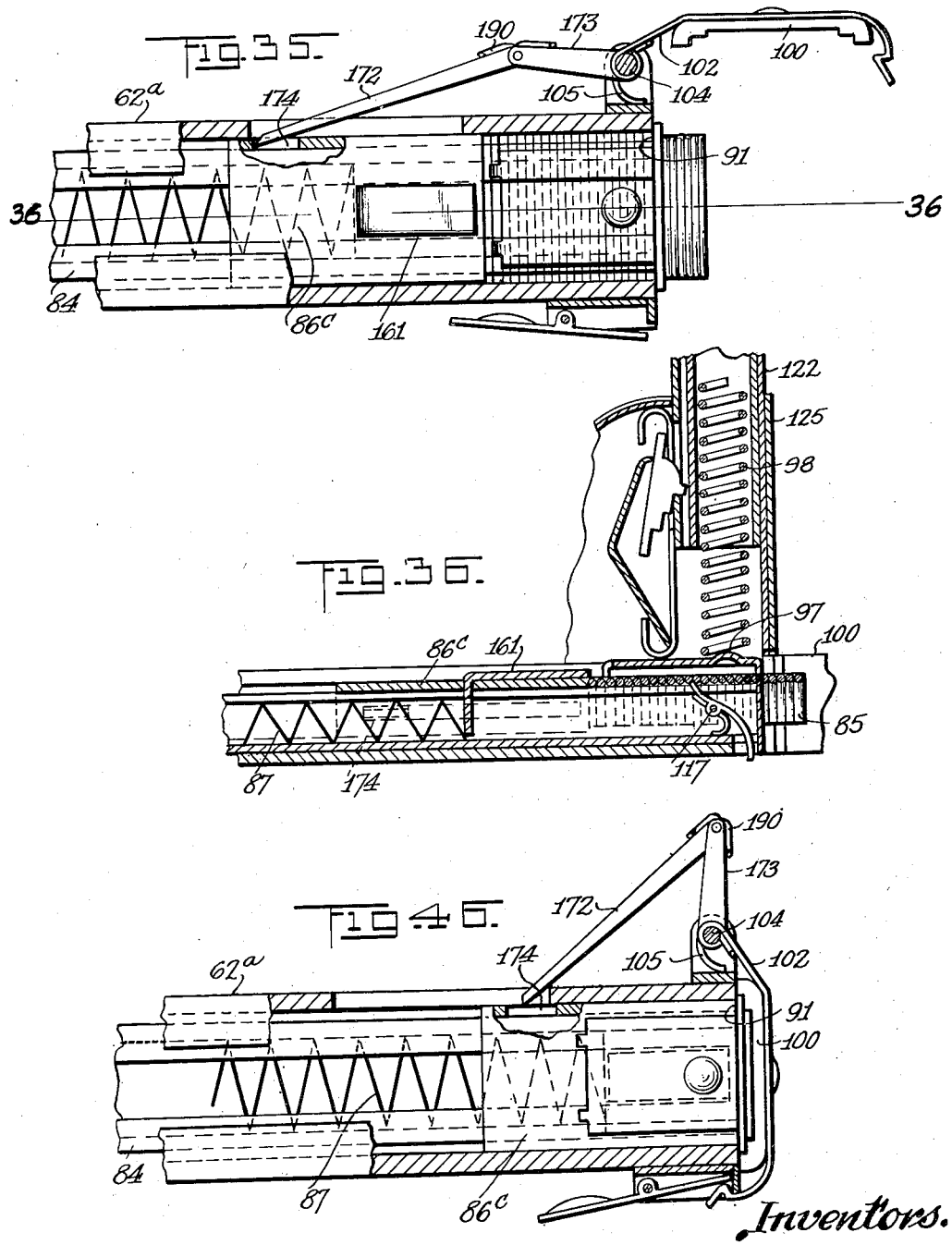

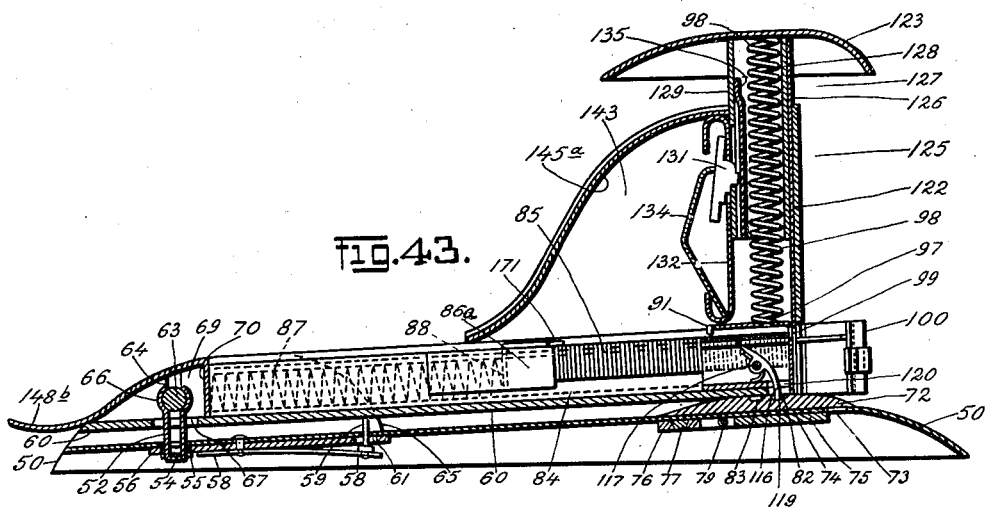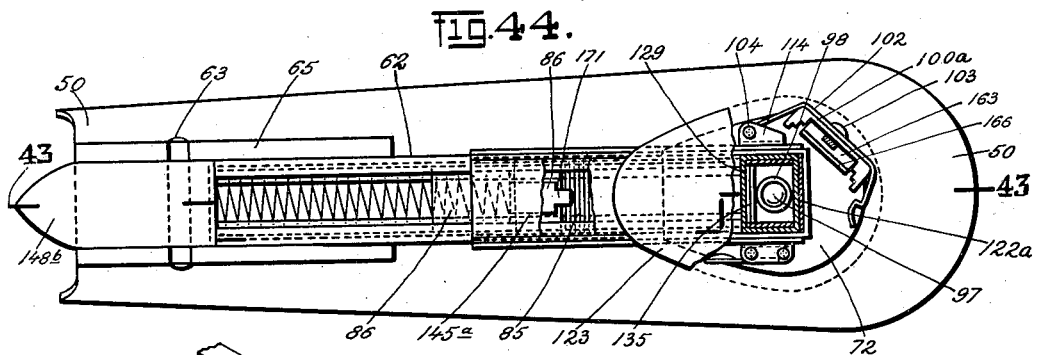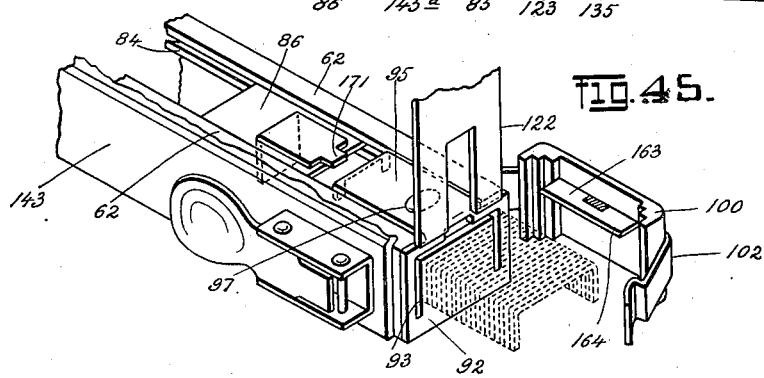

Patented Mar. 4, 1941

2,233,958

UNITED STATES PATENT OFFICE 2,233,958

COMBINATION STAPLING MACHINE AND TACKER

Lou Obstfeld, Brooklyn, N. Y., and John Fancher, Chatham, N. J., assignors to Lou Obstfeld, Brooklyn, N. Y., and Abraham I. Obstfeld, New York, N. Y.

Application February 14, 1938, Serial No. 190,400

26 Claims. (Cl. 1—3)

This invention relates to improvements in a combination stapling machine and tacker.

Broadly, it is an object of this invention to provide a staple machine and tacker so that the staple clips cannot be accidentally discharged or fill the staple channel to clog the machine.

Machines with a front loading arrangement for staples have many advantages but have one disadvantage of the staples being forcibly ejected by the feed spring if the door is suddenly opened without removing the pressure upon the staples. Means were provided to remove the pressure upon the staples by having a latch to hold the spring in a retracted position. However, the operator may forget to latch the feed means or the latch may be jarred loose in the handling of the machine. A secondary precautionary measure has been taken to hold the staples within the magazine by providing a spring door with an angular bend to engage the supply of staples preventing them from shooting out.

In other machines a pawl is provided which engages the staples only when the door is open to prevent the staples from shooting out; the pawl remaining out of engagement with the staples at all other times. Since this pawl is idle except when the machine is reloaded, it may collect dust and dirt, which will interfere with its reliable operation. Furthermore, there is a forward movement of the staples when the door is opened before the pawl engages the staples so that several staples have moved beyond the front end of the core. Such protruding staples are apt to fall off and go to waste and are apt to clog the machine when the door is closed and the machine used.

Our construction prevents the staples from feeding forward when the door is opened or closed so that any possibility of the machine becoming clogged by a staple entering the channel is thereby eliminated. Furthermore, the operation of the pawl with each stroke of the plunger unit retards the accumulation of dust and dirt, thus preventing it from becoming inoperative. However, many users of this type of machine are in the habit of partially depressing the plunger while handling the machine before actually driving a staple. This sub-conscious operating of the plunger unit also operates the safety pawl, thereby allowing the staples to feed forward and possibly cause clogging of the channel or ejecting the staples. It is, therefore, an object of this invention to prevent the possibility of such clogging of the channel by restraining the feed at all times by a pawl safety latch except when the magazine is in contact with the clinching base containing material and only then to permit feeding forward another staple for the next operation.

Another object of this invention is to provide a staple and tacking machine which is dirt and dust proof, neat in appearance, simple and economical in construction and easy to assemble and take apart.

Another object is to provide a combination stapling and tacking machine that can be readily used for both purposes without the usual difficulty in taking apart such machine, avoiding the use of any loose parts that are susceptible of being lost.

Another object is to provide a temporary and permanent clinching means or anvil for the staple so that the staple will at all times come down directly in line with the clinching slot to prevent buckling or crumbling of the staple. There are a number of methods which have been used in the attempt to achieve this purpose, such as frictional adjustments on the anvil, lock-spring adjustments, slide pin adjustments, rotatable adjustments and other means, most of which are deficient in maintaining the desired accuracy. Built up arrangements which comprise many elements have certain inherent inaccuracies so that when the assembly is completed, such inaccuracies in sum total are often sufficient to cause the machine to operate improperly.

It is important to obtain a perfect line-up of the clinching slot and the driven staple and any shifting of the clinching plate must be absolutely avoided, otherwise the driven staple will buckle. It is an object of this invention, therefore, to obtain simple and positive control of the clinching plate so that there can be no mid-way stop between the different slots. The parts must also be readily replaceable in the event new parts are desired.

Occasions arise when it is desirable to drive a staple straight into material in the manner of a thumb tack or thin nail. It is therefore, necessary to remove the clinching base so that the machine can be used as a tacking device instead of a staple clinching device. The present devices are costly, complicated, with many disadvantages involving the removal of screws or the compression of special telescoping pivots and springs. In many devices where a part has been removed from the tacking portion, there are projections from the bottom of the magazine so that it is impossible to place the machine flat upon the surface. For example, if it is desired to attach drawing paper to a drawing board, the bottom projection will tend to mar or scrape the drawing paper, thus damaging it. If an attempt is made to drive the staple through harder material, any such projection from the bottom of the magazine will cause the staple to be driven at an angle other than 90 degrees, thus causing probable crumbling or buckling of the staple. In other machines, the attempt was made to overcome such disadvantages by swinging the base 180 degrees out of the sphere of action and fixing it in such position by a complicated catch arrangement so that the base can be used as a handle. Such an arrangement is heavy, clumsy, inconvenient and difficult to manipulate and not positive in action. It is, therefore, an object of this invention to provide an extremely simple, take-apart device requiring no complicating adjustments and making a simple and readily usable tacking machine with a smooth straight base that will drive a staple straight into the material without marring the surface of such material. This device can be easily pressed back into its original position without the aid of tools to be again used as a staple clinching machine.

Another object is to provide simple and convenient means upon the same device to remove driven staples.

Many machines have the disadvantage of the possibility of the channel becoming clogged by one staple being driven on top of another, until the entire channel becomes eventually distorted and inaccurate, causing bad jams, so that eventually the jams increase in the course of time because of the wearing and distortion of the channel. It is, therefore, an object of this invention to provide a stroke control to completely clear the drive channel before permitting a new staple to be fed into position for driving. It is a further object to provide means to accomplish this result in a simple and inexpensive manner.

Staple machines heretofore have been dipped into molten material for case hardening and then re-dipped into cold water, causing distortion and warpage because of the sudden change in temperature. Such distortion is bound to noticeably affect the working of the machine unless such distortion is corrected by a finishing, grinding operation, thus increasing the cost of production. It is a further object of this invention to provide a wear-plate of hardened material so that it can take up the frequent wear resulting from vigorous action of the driven staple.

Heretofore, any front loading arrangement has always presented many difficulties. In the usual snap type of door, the door has various resilient properties permitting a slight bulge outward when a staple is driven under considerable pressure. If the door is stiffened in order to prevent such bulging, it is very difficult to unlatch. Furthermore, there is bound to be considerable distortion when the door is hardened. If a rigid door is used, complicated separate latching means must be employed to hold the door in fixed position, thus making it an expensive and complicated structure. It is, therefore, an object of this invention to present a simple and inexpensive wear surface eliminating distortion during the hardening process and preventing bulge of the door when the staple is driven under pressure.

A further object is to make a lock arrangement which will catch easily and which will readily open for loading. In Patent No. 2,083,227, a similar door arrangement is described, except that the door latches directly onto the releasing means. While this method is fairly satisfactory, the arrangement described in the present invention is a further improvement.

In a number of machines attempts have been made to control the final forward movement of the staple slide. It has been extremely difficult to control this staple slide to rest adjacent to but not under the blade when the slide reaches the end of the magazine. If the staple slide should project only slightly into the drive channel, either it or the descending driving blade or both may be damaged. If the staple slide stops and leaves one or more staples in the magazine, the remaining staples may tilt forward into the drive channel and thus cause a jam. It is, therefore, an object of this invention to stop the staple slide so that the last staple is fed into the drive channel and the possibility of the blade striking the staple slide is entirely eliminated.

Another object of this invention is to provide a new type of braking means of simple construction for the staple slide.

Another object of this invention is to provide another type of support for the staple crown to prevent buckling in the center.

Another object is to provide upon the machine a simple and efficient means for removing staples from material.

Another object of this invention is to provide a highly efficient machine for stapling or tacking, convenient to operate and to assemble and comprised of parts not susceptible to derangement or getting out of order and durable during continual use and rough handling.

Further objects of this invention are set forth in the following specification, and will be apparent from the description and the drawings which describe a preferred embodiment of the invention.

However, the invention is not intended to be restricted to any particular construction or arrangement of parts, or to any particular application of such construction, or to any specific manner of use, or to any of the various details thereof herein shown and described, since the same may be modified or be applied in varied relations without departing from the spirit and scope of the invention, the machine and the parts herein illustrated merely showing a manner of practicing the invention.

In the accompanying drawings, in which the same reference characters refer to the same parts throughout, and which illustrates the machine referred to:

Fig. 1 is a longitudinal vertical cross-sectional view through the stapling machine and tacker embodying the preferred form of construction of the invention taken on line 1—1 of Fig. 4.

Fig. 2 is a side view of the rear part of the stapling machine and tacker.

Fig. 3 is a sectional view of the magazine of the machine taken on line 3—3 of Fig. 1.

Fig. 4 is a section plan view of the machine showing certain sections of its parts as broken away to disclose the details of construction of the working elements.

Fig. 5 is a sectional view of the forepart of the magazine showing the magazine filled with staples and illustrating the manner in which the staples are held within the magazine by one end of the safety latch.

Fig. 6 is a perspective view of the U-shaped spring for clamping the pivot pin of the magazine and the flat locking pin for holding the U-shaped spring in position.

Fig. 7 is a perspective view of the pivot pin.

Fig. 8 is a perspective view of the front door.

Fig. 9 is a perspective view of the latching and unlatching device.

Fig. 10 is a perspective view of the cover for the housing, the magazine and the rear of the machine.

Fig. 11 is a perspective view of a separate cover for the housing.

Fig. 12 is a perspective view of a staple extractor and the rear end of the magazine formed of one piece of metal.

Fig. 13 is a perspective view of a cover for the rear of the machine, a staple extractor and a stop for the feed spring which also acts to latch the pivot pin, all formed of one piece of metal.

Fig. 14 is a perspective view of the rear part of a cover for the magazine; the pointed end being used as a staple extractor.

Fig. 15 is a perspective view of the preferred arrangement of parts used for moving the clinching plate, showing the locking arm, the notched bar, the pivot piece and the tension spring.

Fig. 16 is a perspective view of the clinching plate.

Fig. 17 is a perspective view of the wear plate showing the manner of locking the wear plate to the magazine.

Fig. 18 is a perspective view of the wear plate showing the channel through which the staples pass.

Fig. 19 is a sectional view of the fore part of the magazine taken in a medial longitudinal plane showing the support given the wear plate by the magazine end.

Fig. 20 is an enlarged sectional view of part of the plunger housing of the machine showing the pawl action; the plunger being in its uppermost position.

Fig. 21 is an enlarged section view of part of the plunger housing of the machine showing the pawl action; the plunger being partly depressed.

Fig. 22 is an enlarged sectional view of part of the plunger housing of the machine showing the pawl action; the plunger being almost completely depressed.

Fig. 23 is an enlarged sectional view of part of the plunger housing of the machine showing the pawl action; the plunger being depressed to its furthermost position.

Fig. 24 is a plan view of the fore part of the base of the machine inverted, to show the position of the parts in relation to the clinching plate.

Fig. 25 is a sectional view of the pivot piece, the clinching plate and part of the locking arm taken on line 25—25 of Fig. 24.

Fig. 26 is an enlarged sectional view of the front part of the wear plate taken on line 26—26 of Fig. 18.

Fig. 27 is a sectional plan view taken on line 27—27 of Fig. 28 of a modification of the front door, showing the tongue upon which the staple crown is supported.

Fig. 28 is a longitudinal section view of the modification of the front door, shown in Fig. 27.

Fig. 29 is a side elevation of a modification of the pivot brackets.

Fig. 30 is a plan view of part of the rear end of the base of Fig. 29 showing the pivot brackets and the different cutouts for the U-shaped spring, the rivet to hold the spring bar and the raising spring and the spring pin.

Fig. 31 is a vertical section through the front part of the magazine showing a modification of the front of the magazine by the addition of an auxiliary arm pivoted with the safety latch, to rest the staple clips.

Fig. 32 is a front view of the safety latch and auxiliary arm shown in part and showing the spring action between the safety latch and auxiliary arm.

Fig. 33 is a vertical section through the front part of the magazine showing a modification of the staple slide acting as a guide for the staple clip.

Fig. 34 is a front view of part of the slotted driving blade, the magazine walls and the core shown in Fig. 33.

Fig. 35 is a plan view of the front part of the magazine showing a modification of the front of the magazine and the link arrangement for moving the staple slide back to leave space for resting the staple clip.

Fig. 36 is a vertical section through Fig. 35, taken on line 36—36.

Fig. 37 is a horizontal section taken on line 37—37 in Figure 39 through the front part of the magazine showing a modification of the front of the magazine by the addition of a button to move the staple slide slightly rearward before the loading operation.

Fig. 38 shows the button released in the arrangement shown in Fig. 37.

Fig. 39 is a side view of the front part of the magazine as shown in Fig. 37.

Fig. 40 is a plan view of a modification of the front of the magazine showing the arrangement to move the staple slide backwards by action of the front door latch.

Fig. 41 is an enlarged perspective showing the means of fastening the wear plate to the magazine.

Fig. 42 is a side elevation of the rear part of the base and pivot brackets partly broken away, showing the base extension for removing driven staples.

Fig. 43 is a longitudinal vertical cross-sectional view through a stapling machine and tacker employing the front door of Figs. 27 and 28, the staple slide and slotted blade of Figs. 33 and 34, the combined cover, staple extractor and spring stop of Fig. 13 and the housing cover of Fig. 11.

Fig. 44 is a section plan view of the machine showing the various parts used in Fig. 43 with certain sections of its parts broken away to disclose the details of construction of the working elements.

Fig. 45 is a perspective view of the front part of the machine with the front door in partially open position, showing the staple clip in phantom being loaded through the channel in the wear plate; the staple clip is shown in withdrawn position out of contact with the staple slide to avoid a confusion of lines; in normal operation, the staple clip is in contact with the staple slide at all times during the loading operation.

Fig. 46 is a plan view of the front part of the magazine showing the link arrangement when the front door is in closed position and the staple slide at the extreme forward end of the magazine.

Fig. 47 is an enlarged portion of the plunger housing showing the groove to receive the thin flexible metal cover.

The invention consists of a combination stapling machine and tacker adapted to be used upon a desk when used as a stapling machine and to be easily and conveniently taken apart and placed against the material when used as a tacker.

Referring to the drawings, the machine as herein illustrated, comprises a base 50 which may be a unitary structure with a degree of rigidity to sufficiently withstand the repeated force applied to the staple driving mechanism.

At the rear end of the base 50 there is a hole 51, shown in Fig. 30, through which there is inserted from the top a U-shaped spring 52, shown in Fig. 6, having shoulders 53 which act as a stop so that the bottom 54 of the U-shaped spring 52 extends below the thickness of the base of the machine and a spring bar 56, shown in Fig. 1. The spring bar 56, having a hole 57 of the same size and shape as hole 51, is positioned beneath base 50 so that holes 51 and 57 are in alignment. Attached to the spring bar 56 at a point near holes 57, there is a raising spring 58 which is attached at the opposite end to a pin 59 which extends through a hole 61 in base 50 to contact the bottom of the magazine 60. A flat locking pin 55 is inserted through the spring bottom 54 to hold the U-shaped spring 52 and the spring bar 56 firmly in position.

A pivot pin 63 is inserted through the vertical magazine walls 62 at the rear end of the magazine 60, the ends of which project beyond the magazine walls 62. In order to attach the rear of the magazine 60 to the base 50, the ends of the pivot pin 63 are placed into slots 64 of the pivot brackets 65, which are attached to base 50. The pivot pin 63 then drops down slots 64 until it contacts the top of the projecting portion 66 of U-shaped spring 52 which projects through an opening 67 in the bottom of the magazine 60. If pressure is placed upon the end of the magazine containing the pivot pin 63, the sides of the U-shaped spring 52 are forced apart allowing the pin 63 to drop to the bottom of slots 64 in the pivot brackets 65. The sides of the U-shaped spring 52 spring back so that the projecting portions 66 wrap around the pin 63, holding it in its downmost position. The opening 67 in the bottom of the magazine 60 is sufficiently large to permit ample play of the U-shaped spring 52. The pin 63 is thereby held firmly in position so that it performs its function of a pivot during the pivoting movement of the magazine. In order to hold the pin 63 within the magazine 60, a semi-circular notch 68 is provided in the side walls 69 of the feed spring stop 70, as shown in Figs. 10 and 13, which engage a pair of grooves 71 in the pivot pin 63, as shown in Fig. 7.

It is evident that the magazine 60 may be replaced upon the spring 52 in reverse position so that the magazine constitutes an extension of the rear of the base. In this manner the base may be used as an extension handle for the magazine.

When it is desired to disengage the magazine 60 from the base 50, the forward end of each is gripped and spread apart until the extreme rear ends of each rest upon one another. This is the normal stop for the upward movement of the magazine 60. Upon the application of additional force, the place of contact of the rear end of the magazine 60 and base 50 acts as a leverage point so that the pivot pin 63 becomes disengaged from the resilient holding power of the projecting portions 66 of the U-shaped spring 52 and the magazine 60 is thus completely detached from the base so that it may be used as a tacker. To replace the magazine upon the base, the same procedure as above set forth is followed.

In thus removing the magazine 60 for use as a tacker, the flat bottom of the magazine can be placed upon the surface of the material, such as drawing paper upon a drawing board and the staple driven straight down at a ninety degree angle without the risk of marring the paper surface or crumbling or buckling of the staple.

At the front end of the base 50, a clinching plate 72, having the usual clinching notches for deforming the legs of the staples for temporary and permanent purposes, rests upon the base 50 which contains a long narrow slot 73. There are two additional holes 82 and 83 in the clinching plate to receive the lower end of a safety latch, such as latch 116 in Fig. 1, as will be hereinafter explained. The bottom of the clinching plate 72 has a metal projection 74 which extends through the slot 73 below the inner surface of the base 50. The clinching plate projection 74 has attached to its underneath side preferably by welding, a notched bar 75 which projects through slot 73 in the base. To the inner surface of the base 50, a small pivot piece of metal 76 is attached preferably by welding, containing a circular cutout 77. A flat U-shaped locking arm 78, as shown in Fig. 15, leg 80 of which terminates in the greater part of a circle and fits within the cutout 77 of pivot piece 76, and the other leg 81 of which terminates in a semi-circle and fits within the notches of notched bar 75, is held in position by a tension spring 79. The indents of notched bar 75 are of relatively deep dimensions so that the locking arm 78 which cooperates with the indents is made to undergo more than a slight motion to change from one indent to another thus preventing any unintentional change in the position of the clinching plate 72. The slightest displacement of the clinching plate 72 is sufficient to cause the staple to crumble and become distorted if the legs of the staple do not strike the clinching slots accurately. The difference in thickness of material being stapled may cause the staple to be driven at a lesser slope than ninety degrees so that there is a downward and sideward pressure exerted against the clinching plate. This pressure has a tendency to shift the clinching plate causing a crumbled staple.

The deep indents in the notched bar 75 eliminates any possibility of shifting of the clinching plate 72 after the action has started. The shape of the indents and the cooperating leg 81 causes a positive locking of the two pieces and a positive movement by the operator is necessary to shift the clinching plate from one position to another, there being no midway stop between positions. The clinching plate 72 by this arrangement results in accurate line-up of the clinching slots and the legs of the driven staple. If necessary, the parts of this arrangement are readily taken out and new parts replaced without the loss of the required accuracy by moving arm 78 away from the notched plate 75 and tilting the entire clinching unit so that plate 75 may be withdrawn through slot 73. To replace the unit the removing procedure is reversed.

Permanently mounted within the magazine walls 62 is a core 84 of substantially the same shape as the magazine 60 except that its dimensions are somewhat smaller, so that when the bottom of the magazine 60 and the core 84 are welded together in superimposed position, as illustrated in Figs. 1 and 3, there will be a space provided along the top and sides to accommodate the staple slide 86 and staples 85. The feed spring 87 is a spiral member with flat sides to fit inside the walls of the core 84 and at its forward end abuts a downwardly turned projection 88 of the staple slide 86 while at its rear end it abuts the spring stop 70.

The staple slide 86 is formed in the usual U-shaped formation with a downwardly turned projection 88 extending down through a slot and into the core 84, acting as the terminal for the feed spring 87, while the upper portion of projection 88 is bent parallel with the top of the staple slide 86 and extends almost to the end of the staple slide forming shoulder 90, thus permitting the side walls of the slide to extend into the slots 93 of the wear plate so that the last staple is presented to the driver. When the staple slide reaches the front end of the magazine 60 the top and sides of the front end of the staple slide projects into the slots 93 of the wear plate and the end 90 of the projection contacts against the wear plate 91, so that the very last staple is fed into the drive channel and the front end and sides of the staple slide is prevented from projecting into the drive channel eliminating any possibility of damage to the blade or the staple slide if the blade should strike the slide. A number of machines have been made upon which the attempt was made to control the final forward movement of the staple slide. Due to the large number of parts in the assembly of such machines and the multiplication of manufacturing tolerances, it has been extremely difficult to control the staple slide so that it comes to rest adjacent the blade, so that in many machines the slide projects into the channel with resulting damage to the descending blade. In other machines, the staple slide comes to rest leaving several staples in the magazine so that the end staple may slip or tilt into the channel causing a jam or possible damage.

A hardened wear plate 91 formed with a right angle bend is placed to cover the front end of the core 84 and the magazine 60, as shown in Figs. 17 and 18. The vertical front portion 92 of the wear plate 91 has an inverted U-shaped slot 93 permitting a staple to pass through. The ends 94 of the slot are beveled at an acute angle so that the legs of a driven staple will straighten themselves vertically into the channel if they should tilt towards the rear of the machine, as shown in Fig. 26. The top 95 of the wear plate 91 rests upon the top of the fore end of the magazine and is latched in position by bent right angle projections 89 co-acting with corresponding notches 96 in the fore end of the magazine. The wear plate 91 drops securely into operative position and rests firmly against the forward end of the magazine walls 62 and the core 84 so that it cannot buckle out of position. A projection 97 is embossed on the top 95 of the wear plate acting as a seat for the plunger spring 98, which holds the wear plate firmly in position under a downward pressure. The hardened wear plate can readily stand constant wear resulting from vigorous action and any back pressure tending to cause wear of the channel if staples are driven through materials offering greater resistance. Thus hardening of the entire front end of the magazine and any distortion due to heat treatment is eliminated. Costly finishing operations and the danger of exposing the softer portions of the metal by grinding often loosening spot welds is also entirely eliminated. By using the wear plate 91, which can be inexpensively and properly heat treated in quantity, any slight distortion can be controlled so that the operation of the machine will not be affected and the machine can be fabricated of ordinary inexpensive metal without special treatment and be readily and easily assembled.

A drive channel 99 is provided between the front of the wear plate and the inside of the front door 100, the front door comprising a piece of metal which has been milled or very accurately formed in a coining press to insure extreme accuracy of its dimensions. Referring to Fig. 8, the hole 101 is embossed in the front door having an elliptical configuration and the door piece 100 is heat treated so as to become extremely hard. A flexible spring strap 102 is provided with a similar elliptical hole as 101 so that a rivet 103 may be employed to hold both the front door piece and the flexible spring strap together, the rivet being driven into the elliptical hole in a riveting machine. The rivet driven within the elliptical hole will not only hold the hardened front door piece 100 and the strap 102 together, but will also act as a means to prevent the hardened piece 100 from twisting or turning out of position upon strap 102 because the rivet completely fills the elliptical configuration hole 101.

The flexible spring strap 102 is pivoted at one end by pivot 104 and the spring 105 tends to swing the door into open position. The other end of the strap is formed with a relatively sharp bend 106 so that the strap holding the door 100 may be latched against latching edge 107 of latching and unlatching device 108, as shown in Fig. 9. Device 108 contains a finger releasing piece 109 containing a hollow end 110 to fit the finger. This finger releasing piece is mounted within a small housing 111 by pivot 112. The end of the finger releasing piece 109 has a tongue projection 113 which fits within a channel at the end of the latching edge 107. Upon pressure being exerted at the hollow end 110, the finger releasing piece pivots around pivot 112 causing the tongue projection 113 to become raised above the top level of the latching edge 107 causing the bend 106 of the spring strap to disengage itself from the latching edge 107, this causing the front door 100 to open because of the pressure of spring 105 against one end of the flexible spring strap 102.

The plunger housing 125 is a U shaped superstructure mounted upon the front end of the magazine 60 and attached to the sides of the magazine 60, preferably by welding.

The machine is provided with an outwardly extending bracket 114 on one side of the plunger housing 125 at the point where it connects with the magazine 60. This bracket is affixed to the housing and the magazine extending outwardly only the necessary amount in order not to disturb the styled outline of the machine. The staples 85 cannot shoot out of the magazine 60 because a safety latch 116 presses firmly against the inside of the staple resting upon the core 84.

Heretofore machines built with a door at the front end of the machine have always presented difficulties in the ordinary snap type of door. Such door usually had resilient properties so that if it were latched against a magazine end, there was sufficient give in the door to permit a bulge outwardly when a staple was driven with considerable force. If the door was stiffened to prevent such bulging, it made it extremely difficult to unlatch. Furthermore, upon hardening of such a door member, considerable distortion was apt to take place. If a rigid door is used, complicated latching means is usually employed to hold the door in fixed position, thus making a complicated and expensive structure.

In the aforesaid type of construction, the inside of the front door 100 is not likely to become distorted during the heat treating process, thus saving much expense. The strap 102 can be made sufficiently rigid and strong so that it will not bulge when the staple is driven, since the staple contacts the hardened inner surface of the front door without contacting the spring strap. The means aforementioned is made to lock readily, being easily opened by means of easy pressure upon the finger releasing piece 109, making it an accurate and simple arrangement without requiring great care in the assembling of the moving parts. This entire arrangement furthermore, combines a wear channel so that every part of the driving channel receives a minimum amount of wear, even though the machine is vigorously used.

The safety latch 116 is mounted in the front part of the core 84 upon a pivot pin 117. The upper end 118 of the safety latch 116 projects upward through an opening in the top of the core 84 so that end 118 will press firmly against the inside of any staples 85 that may be resting upon the core 84. The lower end 119 of the safety latch 116 projects downward through an opening 120 in the bottom of the core 84 and the magazine 60. The safety latch 116 is so hinged that the staples 85 may be loaded through the front end of the magazine 60 against the slight forward pressure of the feed spring 87. The staples 85 will readily slide over the upper end 118 of the safety latch and the safety latch 116 will prevent the staples 85 from shooting out of the magazine. When the door 100 is closed the machine can be operated in the accustomed manner.

When staples have been loaded into the magazine 60, under normal conditions the operator does not push the clip all the way home and leaves one or two staples projecting beyond the front of the magazine. When the door 100 is closed, it pushes the excess staples into the magazine, leaving one staple projecting into the drive channel. During operation of the machine, pressure is applied to the plunger so that the magazine 60 is first lowered onto the clinching plate 72. Further pressure applied results in the driving blade 122 striking the staple in the drive channel, shearing it off from the complete staple clip, and forcing the staple down through the confines of the drive channel and into the material being stapled.

Upon removing pressure from the plunger head 123 after the driving operation, the plunger rises before the magazine because the plunger spring 98 is stronger than the raising spring 58. When the plunger has reached the top of its stroke, the driving blade has risen high enough so as to permit the forward feed of another staple into the drive channel. This occurs because the lower end 119 of the safety latch 116 is still in contact with the material to be stapled and has caused the safety latch 116 to remain tilted so that the upper end 118 is out of engagement with the staples 85, allowing them to feed forward.

Upon continuing the release of pressure on the plunger head, the magazine 60 then rises from the clinching plate 72 because of pressure of pin 59 on raising spring 58 against the bottom of the magazine 60. The upward movement of the magazine 60 permits spring 124 to tilt the safety latch 116 back to its original position so that the upper end 118 again rests against the lower surface of the staple 85, holding it firmly in position.

The machine is now ready for another cycle of stapling operation. At this point, should the door be opened, the fact that the safety latch upper end 118 is resting against the lower surface of the staple 85 holds the staple in position and prevents it from feeding forward or ejecting the clip of staples from the magazine.

If the staple in the drive channel is expelled into the air and if the magazine 60 is then lowered upon the clinching plate 72 without any material between the magazine 60 and the clinching plate 72, the lower end 119 of the safety latch 116 will enter either hole 82 or 83 in the clinching plate 72 and the safety latch 116 will not tilt thus preventing another staple from feeding into the drive channel. It is only when some material covers the clinching plate 72 against which the lower end 119 of the safety latch 116 can press, that the safety latch operates to allow another staple to feed forward.

In some machines having front door arrangements, a pawl engages the staples when the front door is opened, restraining the further forward feeding of the staples. The fact that the front door is used only when loading the machine causes such pawl to remain idle most of the time so that eventually dirt and dust will accumulate in sufficient quantity to interfere with the reliable operation of the machine. Furthermore, the momentary lapse of time when the front door is opened and when the pawl actually engages the staple clip, will cause the staples to feed forward so that several staples protrude beyond the front end of the core. Upon closing the front door, the unsupported projecting staples unless strongly glued together may break off so that the machine may become clogged upon the next operation.

In Patent 2,083,227 a pawl is shown which holds the staple in position at all times and is released by the action of the plunger. This arrangement prevents staples from feeding forward when the door is opened so that no staples project beyond the end of the core to clog the channel upon closing of the door and due to frequent operation remains free from dirt and dust. However, many staple machine users are in the habit of sub-consciously depressing the plunger several times during the handling of the machine so that the safety pawl operates to allow the staples to feed forward thus filling the channel with staples causing a clogged machine upon subsequent operation. This cannot occur in the machine which is the subject of this application since the safety latch 116 allows the staples to feed forward only when the magazine 60 is depressed to the clinching base 72 containing material to be stapled.

The housing 125 has an opening 126 at the top which is approximately square in shape for the reception of the plunger 127. The plunger head 123 may be united with the plunger shank 128 in any desired manner. The coiled plunger spring 98 fits within the hollow plunger 127 which is formed approximately in the shape of a square and the lower end of spring 98 seats over the projection 97 of the top of the wear plate 91. The rear wall 129 of the plunger shank is cut away to form a slot 130. A pawl 131 is positioned in a slot 133 formed in the wall 132 of the plunger housing. Pawl 131 is held in position and pressed firmly against wall 132 of the plunger housing 132 by spring 134, the lower end of which is held in position by the U-shape at the lower end of the wall 132. Pawl 131 holds the plunger 127 in position within the housing 125 preventing it from jumping out of the housing by the upward pressure of the plunger spring 98. A metal piece 135 is attached to the inside of the rear wall 129 of the plunger shank leaving a space 136 so that the plunger spring 98 does not interfere with the operation of the pawl 131.

At the top of the stroke, the lower end of the driving blade 122 is in position above the top of the channel 93 through which staples 85 are fed from the magazine 60 into the drive channel 99. The normal position of pawl 131, when the machine is not in operation is shown in Fig. 20. At the start of the plunger stroke, the driving blade 122 descends sufficiently to cover the top of the channel 93 through which staples 85 feed, at the same time the rear wall 129 of the plunger shank also descends sufficiently far to allow step 137 of pawl 131 to snap into the position as shown in Fig. 21. The plunger cannot then ascend to the top of its stroke since the lower end 138 of slot 130 in the wall of the plunger shank stops against step 137 of the pawl so that the driving blade 122 is left with a partially driven staple within the drive channel 99 and the lower end of the driving blade covers the top of channel 93 from which the staples 85 are fed, preventing the succeeding staple from entering the drive channel.

Upon further pressure upon the plunger head 123, the upper edge 139 of slot 130 begins to contact the curved side 140 of the pawl 131, as shown in Fig. 22. Should the plunger be released when in the position shown in Fig. 22, lower end 138 of slot 130 will contact step 137 of the pawl and stop the further ascending of the plunger. However, if additional pressure is exerted, edge 139 rides down the curved side 140 of the pawl, causing pawl 131 to move downward until it takes the position shown in Fig. 23. Step 137 is then held in position by the front edge of step 141 of pawl 131 contacting the lower edges 142 of slot 133 in the wall 132 of the housing so that step 137 cannot move forward into the path of moving edge 138. In the position shown in Fig. 23, the plunger 127 is depressed to the bottom of its stroke. Upon the release of the pressure upon the plunger head 123, the spring 98 causes the plunger to ascend, the steps 137 and 141 of the pawl 131 being then in position to allow the plunger to come all the way up to the top of the stroke; moving edge 138 of the plunger contacting the forward part of the pawl shifting it upward until it takes the position shown in Fig. 20; the lower end of the driving blade again clears the top of the channel 93 permitting another staple to be fed into the driving channel 99 in the proper position beneath the driving blade 122 ready to be driven.

This arrangement keeps the drive channel free of any succeeding staples until the previous staple has been driven so that one staple cannot be driven on top of another in the drive channel. In machines in which jams and clogging occur, the channel eventually becomes distorted and inaccurate causing increased and continual jams so that in the course of time the machine becomes worthless.

It is desirable to cover the working parts of the machine in order to keep the dust, dirt and other foreign materials from interfering with the working of the mechanism. At the same time the machine should be neatly styled to present a marketable machine. Rear portion of plunger housing 125 has a pair of thin grooves 144 along the rear sloping edges of the side walls 143 so that a thin flexible metal strip 145a, as shown in Figs. 11 and 43, will slide into grooves 144 and take the shape followed by the grooves.

Alternatively the magazine 60 may be covered with a stream-line type of cover for the rear of the magazine, the end 146 being curved in order to give the end of the machine a better appearance to the eye, as shown in Fig. 10. Spring stop 70 for feed spring 87 may be attached to the magazine cover 147 by welding or other means so that the magazine cover with the spring stop may be inserted from the rear end of the magazine 60 and the pivot pin 63 is locked in position by the circular notch 68 locking within grooves 71 of the pivot pin 63 in a similar manner as shown in Fig. 1.

Fig. 10 shows a single cover combining a curved end 146, a cover portion 147 for magazine 60 with a ridge 187 to make the magazine cover portion 147 rigid and the flexible end 145 for the plunger housing which slides within grooves 144 of the plunger housing combined with the spring stop 70.

Fig. 14 shows a variation of a magazine cover portion 147a with a curved tapered end 148 which can be readily used as a staple extractor and having a bracket 70b attached thereto by welding, said bracket having notches 68a to receive grooves of a locking pin 63 which holds cover 147a in position and acts as a stop for spring 87.

Fig. 13 shows another variation containing the feed spring stop and cover which acts to latch the grooves of pivot pin 63 and the end being curved and tapered so that it may be used as a staple extractor.

In using the stop and cover as shown in Fig. 13, the top of the magazine 60 can be left uncovered and the housing cover as shown in Fig. 11 can be inserted in the grooves 144 of the housing to cover said housing.

Fig. 12 shows another variation of the staple extractor 148a which forms the end of the bottom of the magazine 60, the assembly being similar to Fig. 1 showing the end 148 of the core as a staple extractor.

It is obvious that if the cover and stop as shown in Fig. 13 are used with magazine 60, the staple extractor 148 as shown in Fig. 1 would be cut off abruptly and the extractor portion 148b of the cover as shown in Fig. 13 would extend beyond the rear end of the machine.

The same would apply if the combined cover and extractor as shown in Fig. 14 are used.

The various types of construction for the end of the machine and the cover of the plunger housing and the magazine is simple to manufacture providing a convenient method of disengaging the cover in order to get at the working parts. Furthermore, this type of manufacture effectively shields the various parts of the working mechanism and there is no need for great accuracy in manufacture. Closing the end of the magazine effectively covers the usual open end, at the same time giving this end beauty and utility. Attaching the spring stop to the end of the cover performs the function of acting to retain the feed spring in position and as a means for locking the pivot pin 63 in firm position, thereby performing several functions. By disengaging the semi-circular notches of the spring stop 70 from the pivot pin, the entire cover comes off to expose the feed spring and other parts of the magazine so that the various parts of the machine may be removed. To disengage the walls of spring stop 70 any instrument of the screw driver type is inserted through opening 67 after the magazine has been removed from the base and the end piece 70 having notches 68 cut from flexible material are readily disengaged from the pivot pin 63 by pressure from below.

The spring stop 70 containing semi-circular notches 68 is made of flexible metal. To disengage the notches 68 from the grooves 71 of the pin 63, sufficient pressure is exerted upon the cover near the spring stop 70 so that the pin 63 can be removed. The cover will bend sufficiently so that notches 68 will become disengaged from the grooves 71. Another manner of disengaging the notches from the grooves is to insert a pointed instrument through opening 67 to force the wall of stop 70 slightly toward the front of the machine.

When the magazine 60 is removed from the base 50, the upper portion is frequently used to drive staples into material in the manner of driving tacks, that is, without the staple becoming clinched, such as attaching drawing paper to drawing boards or various types of decorations in store windows. Staples so driven must be removed subsequently when new material is stapled in position to take the place of the previous material. Usually staples are removed with knife blades, screw drivers, finger nails, or whatever may be handy, unless some ready means is provided.

The rear cover alternative sections as shown in Figs. 13 and 14 are formed with tapered ends 148b and 148c which project beyond the magazine end so that they may be used as staple extractors. Another means provided for staple extracting is to extend the end 148 of the core as shown in Fig. 1. Another variation may be the extension of the end 148a of the magazine as shown in Fig. 12 or extension of the base 50a, as shown in Fig. 42. In all cases, the end projection for removing staples is bevelled to a fairly thin edge and hardened so that it can stand wear. It is of great advantage to combine the tacking and removing member in a single unit, since at all times the staple extractor is handy when needed, so that the complete job may be done with one piece of mechanism.

Another variation of retractor for supporting the staple bar is shown in Figs. 27 and 28. This retractor is in the nature of a tongue 163 upon a pin 164 with a supporting spring 165. The tongue 163 has a bevel 166 where it enters the drive channel 99 so that it acts as a support for the staple crown. The entire arrangement is made to fit within the front door 100; however, the spring 165 and the tongue 163 are made of metal sufficiently strong to withstand the necessary and continual use to which the machine is put.

In using the front door shown in Figs. 27 and 28, the staple is fed from the magazine into the drive channel. As the downward motion of the plunger is started, the staple crown rests on tongue 163. As downward motion of the staple is continued in the drive channel, the pressure of the staple against tongue 163 causes it to pivot about its axis 164, the tongue 163 being held firmly against the end part of the staple crown by pressure of spring 165. As the staple starts to penetrate into tough material, the crown tends to buckle downward. The action of supporter 163 resists this tendency. As the staple passes further down the channel, the tongue 163 pivots still further and eventually allows the staple crown to disengage from tongue 163 by sliding off the beveled edge of the tongue 163.

Figs. 31 to 46 show various methods of accomplishing the loading of the magazine with ease.

To load the machine as shown in Fig. 31, the door is first opened by unlatching the latch referred to in other portions of the application. The auxiliary arm 167 and tongue projection 170 are then readily apparent, the tongue being on the same level as the top surface of the core 84 and projecting forwardly therefrom, giving the effect of a step. A clip of staples is brought near the front end of the machine and rested on this step, thereby becoming at the same time aligned with the top surface of the core. This eliminates the possibility of groping around, looking for the slot into which the staple clip is to be loaded. The leading staple of the clip is then guided by this projection 170 and can be easily slid into the opening between the core 84 and the magazine wall 62. The staple clip is inserted its full length and the door is then closed and latched.

Then, during operation of the machine, at the proper interval the safety latch arm 116 has allowed the staple clip to feed forward so that a single staple is in the foremost portion of the machine against the door, resting on tongue 170 and ready to be driven. The descent of the driving blade causes the latter to come in contact with the staple and force it downwardly through the drive channel. During this time, arm 167 is swinging through an arc with tongue 170 contacting against the crown of the staple and supporting it while it is being depressed. Near the bottom of the stroke, the arm 167 has swung through a sufficient arc so that there is exerted on it a backward pressure forcing it out of contact with the staple crown and leaving the staple entirely free during the final interval of being driven into the material to be stapled, so that the staple eventually becomes entirely disengaged from any portion of the machine and remains in the material into which it has been driven.

Referring to Fig. 31, an auxiliary arm 167, slidably mounted on the same pivot 117 as the safety latch 116, is used to guide the staple clip. This arm 167 has a projection in the form of a tongue 170 bent upward so that its upper edge is at the same level as the top surface of the core 84. It can be readily seen that by resting the leading staple of the clip on this edge it can be easily guided into the opening between the core 84 and the magazine wall 62. When the door 100 closes and the blade 122 descends, it forces the arm 167 rearwards, which allows the staple to be driven. While this action is taking place, the arm 167 serves another purpose, that of a staple support. Spring 168 moves the arm 167 back to its original position when the blade 122 rises. A front view of the arms of this arrangement is shown in Fig. 32.

Referring to Fig. 33, the pusher 86a has a tongue 171 formed on its forward end. This tongue is so formed as to act as a guide for the upper surface of the staple clip. The blade 122a is slotted so as not to impinge on the tongue when driving the last few staples. Fig. 34 shows this arrangement with the front wall of the plunger housing cut away.

Referring to Fig. 46 and Fig. 35, projecting ridge 161 strikes against wear plate 91 simultaneously preventing the staple slide 86c from entering the drive channel, and aligning the slide opening 174 in slide wall with link 172. Link 172 is pivotally connected to link 173 which in turn is rigidly connected to door strap 102. As shown in the above-mentioned figure, when the door is closed, link 172 is automatically held retracted from possible contact with staple slide or staples because it rests on edge of cut-out portion of side wall.

When the door is opened, as shown in Fig. 35, it is evident that upon counter-clockwise rotation of the door or door strap 102, link 173 will also rotate rigidly thereto. This action allows link 172 to slide into contact with the pusher, obviously being forced to do so by the resilient means 190. Further rotation of the door and consequent rotation of attached members results in link 172 engaging opening 174 in staple slide wall. From this point on, further opening of the door will result in retraction of the staple slide, thus leaving an unobstructed opening which facilitates loading.

Fig. 36 is taken from Fig. 35 on line 36—36 showing the pusher back and the staples inserted.

The manner of loading shown in Figs. 37, 38 and 39 is similar to that shown in Fig. 35, except that in this construction the slide is forced rearward by means of the button 180 which is pushed into the opening 182 in the pusher 86e. After the staples are inserted, the button is released and disengaged from the pusher by means of the spring 181.

By the construction shown in Fig. 40, the same result is obtained. The door unlatching device 110a is utilized in forcing the pusher 86d back. The latch 110a has a wedge 186 on its rear side which engages the wedge 185, thus forcing the pusher back by means of the arm 183 and 184.

While we have described our invention in preferred forms, we desired it to be understood that modifications may be made for various types of a machine of the character described and that no limitations upon the invention are intended that are imposed by the scope of the appended claims and such claims should be construed as broadly as permissible in view of the prior art.

We claim:

1. In a machine of the character described, an open end magazine for receiving a supply of staples, means for advancing the staples toward the front end, a door at the front end of said magazine, said door pivoted on one side of said magazine and latched to an immovable projection on the other side of said magazine, a pivoted finger releasing latch for opening said door, said latch being pivoted adjacent said immovable projection.

2. In a machine of the character described, a magazine for retaining a supply of staples, said magazine having an open end, means at said open end for receiving staples from said magazine and driving said staples into engaged relation, means in said magazine for advancing said staples toward the forward end, a door for closing the front end, a strap fixed to said door preventing twisting of said door, a portion of said strap being pivoted to a portion of said magazine, another portion of said strap being arranged to latch over a latching edge, pivoted means arranged to cooperate with said second named portion of said strap for unlatching said portion to permit opening of said door.

3. In a machine of the character described, a magazine for retaining a supply of staples, said magazine having an open end, means at said open end for receiving staples from said magazine and driving said staples into engaged relation, means within said magazine for advancing said staples toward the forward end, a rigid door for closing said front end of said magazine, a non-circular hole in said door, fastening means connecting said front door, and a spring strap, said fastening means acting with said non-circular hole to prevent said front door from twisting out of position on said spring strap, one end of said spring strap being pivoted at one side of a plunger housing, the other end of said spring strap being latched over a notched latching edge, a finger releasing member mounted to fit within said notched latching edge for opening said front door.

4. In a machine of the character described, a magazine, a plunger housing mounted at forward end of said magazine, a metal strip covering said plunger housing, the top of said magazine, and the rear end of said magazine, and means for holding said metal strip rigidly fixed in position.

5. In a machine of the character described, a plunger housing having sloping edges and means inside and adjacent to said edges for holding in fixed position a flexible cover adjacent said edges.

6. In a machine of the character described, a magazine, a pin on said magazine, a plunger housing and plunger arranged at the forward end of said magazine, a cover for said magazine arranged to complete the enclosure of the rear part of said magazine, said cover having a bent face member, said face member having bent portion with notches cooperating with said pin for holding said cover in position upon the rear part of said magazine.

7. In a machine of the character described containing a magazine and staple feed means in said magazine, a bent piece of metal to fit at the end of said staple magazine, said bent piece of metal having a curved end covering a sloping end of said magazine and an angle side acting as a stop for the feed means.

8. In a machine of the character described, a plunger housing having sloping edges and fine grooves extending along the inside surfaces adjacent said edges, a strip of flexible metal to fit within said grooves for covering the top of said housing.

9. In a stapling machine and tacker of the character described, a magazine with a sloping end, a sloping plunger housing having grooves therein, a metal strip completely covering the top of the staple magazine and the plunger housing, the rear end of said metal strip being curved to cover the sloping end of the staple magazine, the central portion having a bead embossed thereon for rigidity, and the front end being sufficiently flexible to slide within the grooves along the upper sloping edge of said plunger housing.

10. In a machine of the character described, a front door mounted to swing sidewardly and having an accurately formed recess providing a wear channel, a tongue, a spring supporting said tongue, said tongue moveably mounted in said door and projecting into said wear channel, whereby the staple crown is supported during the driving operation preventing buckling of the staples.

11. A combined staple machine and tacker, comprising a base, a clinching plate at the front end of said base, a magazine portion having means for feeding and driving staples, a pivot pin mounted on the rear of said magazine portion, a pivot bracket mounted upon said base and arranged to cooperate with said pivot pin, to yieldably engage said pivot pin whereby said magazine portion may be instantaneously disengaged from said base for use as a tacker.

12. A stapling machine and tacker comprising a magazine portion, means for receiving a supply of a plurality of staples arranged for feeding along the magazine, means for causing movement of the arranged staples toward the fore end of said magazine, a casing at the fore end of said magazine, a reciprocating plunger within said casing, a pivot pin mounted in said magazine portion, a pivot bracket mounted upon a base and arranged to cooperate with said pivot pin in said magazine portion to permit a pivoting motion of said magazine above said base and to separate from said pivot pin upon application of pivoting force in excess of that needed for normal pivoting motion, whereby said magazine will separate from said base.

13. A stapling machine and tacker comprising a magazine, means for receiving a supply of a plurality of staples arranged for feeding along the magazine, means for causing movement of the arranged staples toward the fore end of said magazine, a casing at the fore end of said magazine, a reciprocating plunger within said casing, a base upon which said magazine is pivoted, stop means between said base and said magazine limiting the upward pivoting motion of said magazine upon said base, said pivoting means between said magazine and said base being arranged whereby a continued pivoting movement of said magazine upon said base beyond the limits interposed by said stop means results in separation of said magazine from said base.

14. A staple machine wear plate formed at an angle and having a top section acting as a seat for a plunger spring, a face section covering the front end of a core and having an inverted U-shaped channel, said channel being aligned with said core upon which staples are fed, said face section abutting the forward end of said core and magazine for rigidity.

15. A staple machine wear plate formed at an angle and having a top section fastened to the top side of the magazine, said top section overlapping a portion of the magazine, a face section containing an inverted U-shaped channel, said channel being aligned with said core, and said face section covering the front end of said core and abutting said core.

16. In combination with a stapling machine, a clinching plate having the conventional clinching notches, said clinching plate mounted on the base, a projection from the bottom of said clinching plate passing through a slot in said base, said projection having notches and arranged to contact a locking arm, said locking arm being pivotally mounted beneath said base to cooperate with said notches whereby a definite and positive linear movement is required to shift the position of the clinching plate.

17. In combination with a stapling machine, a clinching plate having the conventional clinching notches, said clinching plate mounted at the top of a base over a slot in said base, a projection from the bottom of said clinching plate and passing through said slot in said base and extending below the underneath surface of said base, said projection having notches, a locking arm pivotally mounted beneath said base to cooperate with said notches of said projection whereby a definite and positive linear movement is required to shift the position of the clinching plate from one notch to another.

18. In a machine of the character described comprising a magazine, means for receiving a supply of a plurality of staples arranged for feeding along the magazine, means for causing movement of the arranged staples toward the fore end of the magazine, a casing at the fore end of said magazine, a reciprocating plunger within said casing, a core within said magazine, an arm moveably mounted within said magazine, one end of said arm normally contacting against the staple clip to prevent feed of the staples into the drive channel, another end of said arm projecting through an opening in said magazine said last named end cooperating with means on said base whereby the former end of said arm will maintain contact with the staples if no material is to be stapled.

19. In a machine of the character described comprising a magazine, means for receiving a supply of a plurality of staples arranged for feeding along the magazine, means for causing movement of the arranged staples toward the fore end of the magazine, a casing at the fore end of said magazine, a reciprocating plunger within said casing, a core within said magazine, an arm moveably mounted on said magazine, one end of said arm normally contacting against the staple clip, another end of said arm projecting from said magazine, means to permit releasing staple contact of the arm when the magazine is depressed onto material to be stapled.

20. In a machine of the character described, a magazine for staples, a plunger reciprocal in a housing at the forward end of said magazine, a core within said magazine, a staple channel between the walls of said core and the inside walls of said magazine, a drive channel at the forward end of said magazine, a door comprising one wall of said channel, a moveable slide riding within said staple channel, spring means for moving said staple slide toward the front end of said magazine, a wear plate containing a channel through which staples are fed, said door adapted to be opened to permit loading of staples, means to retract the staple slide from the forward end of the magazine sufficiently to clearly expose the channel of the wear plate to facilitate loading of the staple clip.

21. In a machine of the character described, comprising a magazine, means for receiving a supply of a plurality of staples arranged for feeding along a magazine, means for causing movement of the arranged staples toward the fore end of the magazine, a casing at the fore end of said magazine containing a drive channel, a reciprocating staple driver within said casing, means within the magazine cooperating with the material to be stapled to operatively allow the succeeding staple to be fed into the drive channel when the previous staple has been driven and the drive channel has been cleared by the staple driver preparatory to receiving another staple.

22. In a stapling machine of the character described, the combination of a staple carrying arm containing staple feed spring means, a front closure, a staple driving member, means for holding the staples against the feed spring pressure when the front closure is open or closed, means independent of the front closure for releasing the last named means to permit staples to feed forward and under the staple driving member when placing the staple carrying arm on the material to be stapled.

23. In combination with a stapling machine comprising a magazine portion for feeding and driving staples, a base on which said magazine is mounted, clinching means on said base having conventional clinching notches and safety notches on the upper surface of said clinching means, said safety notches cooperating with staple feed control means projecting from said magazine, to prevent staples feeding forward unless material is inserted between said safety notches and said staple feed control means projecting from said magazine.

24. A combined staple machine and tacker, comprising a base, a clinching plate at the front end of said base, a magazine portion having means for feeding and driving staples, yieldable pivot means arranged between said base and said magazine whereby said magazine may be instantaneously disengaged from said base for use as a tacker, said disengaging taking effect in a single direction of movement.

25. A combined staple machine and tacker, comprising a base, a clinching plate at the front end of said base, a magazine portion having means for feeding and driving staples, yieldable pivot means arranged between said base and said magazine whereby said magazine, which is normally pivoted directly over the base, may be instantaneously disengaged from said base and then re-engaged in opposite manner to extend away from but substantially in line with the base whereby said base may be used as a handle while said magazine portion is used as a tacker.

26. A staple machine wear plate formed at an angle and having a top section acting as a seat for a plunger spring, a face section covering the front end of a core and having an inverted U-shaped channel, said channel being aligned with said core upon which staples are fed, said face section having one portion of the U-shaped channel enlarged to cooperate with means to facilitate loading, said face section abutting the forward end of said core and magazine for rigidity.

LOU OBSTFELD.
JOHN FANCHER.